United States Patent Office 3,494,046
Patented Feb. 10, 1970

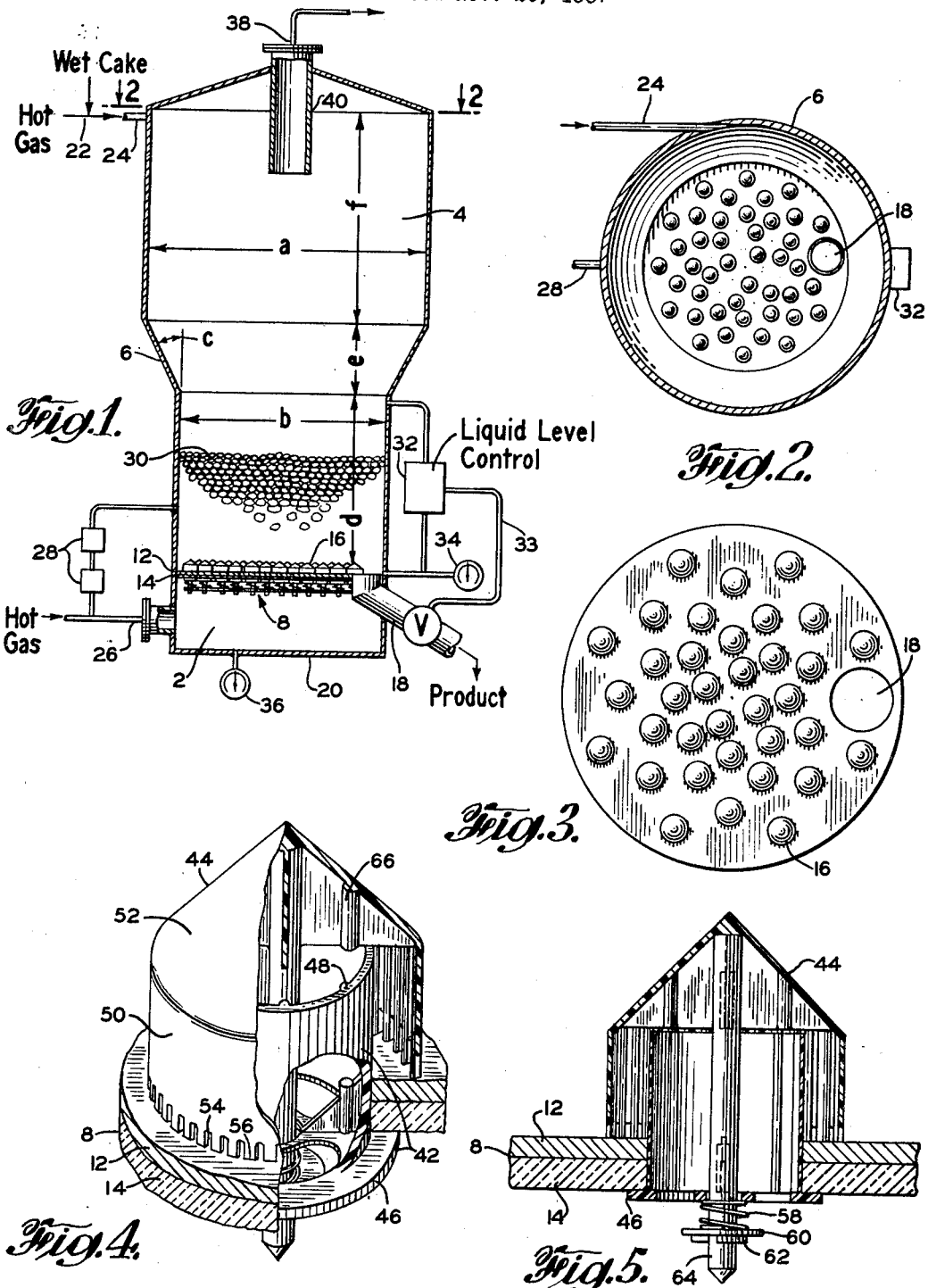

---

3,494,046
FLUID BED DRYING SYSTEM
Gordon G. Harkreader, Charleston, W. Va., assignor to Union Carbide Corporation, a corporation of New York
Filed Nov. 20, 1967, Ser. No. 684,401
Int. Cl. F26b 3/16, 17/00
U.S. Cl. 34—10                                11 Claims

ABSTRACT OF THE DISCLOSURE

A system for fluid bed drying of wet solid vinyl chloride polymer is described comprising a lower plenum, an upper drying compartment, a perforated distributor plate mounted between the plenum and drying compartment, inlet and outlet means for the drying gas, inlet means for the wet solid vinyl chloride and a product take-off means. This system employs a plurality of unique bubble caps with a cone-shaped top mounted through the distributor plate which precludes collection of polymer on the top and polymer decomposition.

---

This invention relates to methods and apparatus for drying wet solids, capable of being fluidized and more particularly for drying heat sensitive solids.

The drying of wet solids has been achieved in the past in a host of ways. However, when the solids being dried are heat sensitive such restrictions as maximum heating temperature and maximum exposure time narrow the choice of suitable available drying methods considerably. To these restrictions are added the further requirement that in order to be practical the drying method must be efficient, that is, remove the maximum amount of the wetting fluid per unit weight of the solid in a minimum time, with a minimum number of pieces of drying apparatus. Since a cheap gas such as air is conventionally used to accelerate the removal of the wetting liquid from the wet solid during the drying process, the ratio of the weight of wetting liquid removed per weight of gas used should be as high as possible for maximum efficiency. In the case of high molecular weight polymers, such as vinyl chloride resins, in addition to the requirements described above, there is still an additional one, namely, that the dried solids have a solids content of at least about 98% by weight, and preferably of at least about 99% by weight and even more preferably of at least about 99.8% by weight.

Aside from such obvious considerations as the cost of shipping wetting liquid along with the product, fabricators of films, sheets, and shaped articles from particulate high molecular weight polymers cannot tolerate the presence of wetting liquids outside these limits because of gassing and bubble formation in their finished products. Unfortunately, the vinyl chloride resins in particular and other high polymers in general become increasingly difficult to dry efficiently, as the solids content of the wet solids increase. This is due to the porous nature of such materials in which a significant amount of the wetting liquid is not on the particle surface from which the wetting liquid is most quickly and efficiently removed. Thus if one were to delineate a drying operation by a graph in which the ordinate is drying efficiency and the abscissa is time, in the case of steel balls wet with water a straight line would probably be obtained for most drying systems with the slope determined by the drying temperature. Stated another way, one might say that in this simple system a constant drying rate period was observed from the beginning up to 100% solids content. However, in the case of porous particles such as vinyl chloride resins, wet with water and residual monomers a straight line or constant drying rate period is obtained for only part of the drying operation and then as the solids content of the resin passes about 90% total solids, there is a breakpoint as the efficiency falls off and we enter a falling rate period because the drying operation changes from one of chiefly removing surface volatiles to one which is a combination of surface drying and diffusion of volatiles within the resin particle to the surface. The obvious expedient of using drying temperatures high enough to accelerate the diffusion process is unavailable because the decomposition temperatures of the resins are well below such heights.

Fluid bed dryers are particularly useful for drying porous particles. However, when they are used for drying high polymer resins, the drying temperature must be not only below the resin decomposition point but also below the resin softening point as well, otherwise the resin particles agglomerate and can no longer be fluidized. Resin agglomerates stick to the dryer surfaces interfering with normal gas flow design and in the case of vinyl chloride resin present the added disadvantage of decomposing with accompanying liberation of hydrogen chloride catalyzing the further decomposition of vinyl chloride resin and corroding the surfaces of the fluid bed dryer.

Prior art fluid bed dryers were unsuitable for drying vinyl chloride resins for a number of reasons. First of all, the gas inlet systems were incapable of handling small clumps of vinyl chloride resin which had not reached the fluidized state and these clumps fell to the gas inlet distributor plate, where they began to decompose after drying since the gas inlet temperature is generally well above their decomposition point but does not decompose resin particles in the fluid bed because this temperature is rapidly lowered by the latent heat of vaporization of the wetting fluid on the resin particles. The gas inlet ports in the distributor plate of prior art fluid bed dryers whether they be of the bubble cap type or some other design also are unsuitable for the critical requirements peculiar to fluidizing vinyl chloride resin particles. Then too with the prior art expedient of removing dried fluidized particles by controlling the leveling bed with an overflow weir or dam, dead spots often develop and provide a site where dried vinyl resins accumulate and decompose.

A fluid bed dryer has now been discovered which overcomes the obstacles described above in providing a more efficient drying system than previously known and which also provides a more efficient system for the removal of dried product from the fluid bed dryer. This improved fluid bed dryer is described in detail in the specification which follows and in the accompanying drawings.

In the drawings:
FIGURE 1 is a vertical elevation of the improved fluid bed dryer;

FIGURE 2 is a plan view of the fluid bed dryer with the top removed;

FIGURE 3 is a plan view of the distributor plate of the fluid dryer showing some of the bubble caps mounted thereon and the opening of the dried solid take-off device;

FIGURE 4 is an isometric view partly cut away of one of the bubble caps; and

FIGURE 5 is a vertical elevation of a bubble cap showing its position when mounted in the distributor plate of the fluid bed dryer.

Referring now to the drawings in detail, the fluid bed dryer shown in FIGURE 1 comprises a lower plenum 2 and an upper drying compartment 4 which although not necessary for the practice of this invention is shown having two different diameters namely a and b resulting in a constriction having an angle c. The angle c called the angle of repose is ideally of sufficient magnitude that gravity will prevent solid particles impinging upon constricted drying compartment wall 6 from adhering thereto. The lower plenum 2 and upper drying compartment 4 are separated by a perforated gas distributor plate 8 consisting essentially of an upper section of metal 12, a lower section of insulating material 14, a bubble cap 16 mounted through each perforation save one, and a dried solids take-off device 18 mounted through one perforation and extending through the plenum wall 20. The height of lower section of the drying chamber 4 having a diameter $b$ is $d$, the height of the uppermost section of drying chamber 4 is $f$, and the height of the constricted section of drying chamber 4 forming angle $c$ is $e$. It is preferred that the ratio of $f:d$ be about 7:6. The dispersed wet solids to be dried formed by mixing hot gas and a wet cake of the solid with a mixing means at point 22 are introduced through inlet means 24 which passes through the wall 6 of the upper drying chamber 4 at an angle such that the dispersed wet solids are introduced to the upper drying chamber 4 in a swirling motion. Concurrently hot gas is passed into the plenum chamber 2 through gas inlet means 26 and then through gas distributor plate 8 into drying compartment 4 where the hot gas passing upwardly meets the wet dispersed solids descending and produces a turbulent fluidized bed 30. The temperature of said hot gas is controlled by control 28 which simultaneously records the temperature of the hot gas passing through inlet 26 and the temperature of the turbulent fluidized bed 30. Since the temperature in the turbulent fluidized bed 30 depends on many variables some of which include the type of solid being dried, its porosity, the wetting fluid and its latent heat of evaporation, the temperature of the hot gas passing through the inlet 26 through the plenum 2 and the distributor plate 8 into the turbulent fluidized bed 30, the temperature of the hot gas entering the gas inlet 26 controlled by the temperature controller 28 is adjusted to maintain a constant temperature in turbulent fluidized bed 30. The height of the fluidized bed 30 is maintained at a constant level by connection 33 and the liquid level control 32 through control of the product take-off control means 18. Pressure in the turbulent fluidized bed 30 is recorded by means of pressure gauge 34 and the gas pressure in the plenum 2 is recorded by means of pressure gauge 36. Wet gas is removed from the upper drying chamber 4 through gas outlet means 38. The cylinder 40 communicating the gas outlet means 38 and extending into the drying chamber 4 is an optional expedient to guard against sweeping solids entering through inlet means 24 into drying chamber 4 into gas outlet means 38.

It is preferred as shown in FIGURE 2 that the inlet 24 be disposed tangentially to the wall 6 of the drying chamber 4. This arrangement not only minimizes the chance of sweeping out solid particles through outlet 38 but also effects a more gradual introduction of wet solid particles to the turbulent fluidized bed area 30 since the wet particles descend in a spiral path rather than in a more direct path to the turbulent fluidized bed 30. There is also the added benefit that some drying of the wet solid particles can take place on their downward path.

The plan views of FIGURE 2 and FIGURE 3 show the location of the dried solids take-off device 18 along with some but not all of the bubble caps 16.

A single bubble cap 16 mounted in the distributor plate 8 is shown in detail in FIGURES 4 and 5. The bubble cap 16 can be separated into two main parts which can be described generally as a base 42 and a dome 44. The base consists essentially of a bottom flange 46 supporting a vertical cylindrical section 48 extending up through the distributor plate 8. The cylindrical section 48 acts as a dam and prevents any resin from sweeping into the plenum 2. Positioned above and surrounding the base 42 is the dome 44 which consists essentially of a cylindrical section 50 which is enclosed at the top by a cone 52. The lower periphery of the cone 50 contains a plurality of slit openings 54 which serve as orifices for the flow of hot gas from the plenum 2 to the drying chamber 4 and turbulent fluidized bed 30. The size and number of these slit openings are determined by the volume of gas to be passed to provide a pressure drop of about 1 inch of water and preferably of about 5 to 15 inches of water. The unslotted portions 56 of the lower periphery of the cylinder 50 are in firm contact with the top of metal plate 12 of distributor plate 8. The dome 44 and base 46 are held together by the pressure exerted by spring 58 which is held in tension against base 46 by means of a washer 60 and a cotter pin 62 passing through shaft 64 axially positioned through the base 46 and dome 44 and integrally attached at its upper extremity to the cone 52 of dome 44 and reinforced therein by means of 4 flanges 66 integrally attached to the cone 52.

Although it is not critical it is preferred to use a metal such as stainless steel for the fabrication of the upper plate 12 of the distributor plate 8. The material of construction used for the lower insulation plate 20 is not narrowly critical and material such as plywood, asbestos, transite, polystyrene foam, polyurethane foam and the like can be used. The material of construction used for the fabrication of the bubble cap 16 is also not narrowly critical but it is preferred to use a noncorrosive material which is heat resistant, easily shaped and is a poor conductor of heat. It has been found convenient to use glass filled Teflon (trademark for tetrafluoroethylene polymers) or similar fluorinated hydrocarbon polymers for the construction of the bubble cap 16.

The arrangement of the parts in the distributor plate permit the use of a hot drying gas heated to a temperature considerably above the decomposition or softening points of vinyl chloride resins since the upper plate 12 of the distributor plate 8 is cooled by the latent vaporation of the wetting liquid on the wet fluidized particles and does not attain the temperature of the hot gas in the plenum 2 because of the insulating effect of the lower plate 14 of the distributor plate 8. The plurality of slits 54 in the bubble caps 16 and their close proximity to the upper plate 12 of the distributor plate 8 provides a far greater distribution of hot gas than was available with prior art bubble caps thereby minimizing the amount of dried solid in contact with the upper plate 12, thereby eliminating dead spots and stagnant areas of dried solid or polymer resin. The arrangement of the orifices 54 also provide an efficient means of providing a turbulent fluidized bed in the drying chamber 4, thus avoiding channeling, slugging and other undesirable effects.

Using the fluid bed dryer described above, a method of drying wet solids capable of being fluidized in it has been discovered which comprises the steps of:

(A) Dispersing the wet solids in a gaseous stream;

(B) Introducing the dispersed wet solids into the upper section of the drying compartment 4 through gas inlet 24 at a temperature of about −0 to 100° C.;

(C) Introducing a gas at a temperature of about 50 to 200° C. into a plenum 2 at a rate sufficient to maintain a bed of solids in a turbulent fluidized state in drying chamber 4;

(D) Removing the wet gas through the gas outlet means 38; and (E) Removing dried solids through solids take-off 18 at a rate sufficient to maintain turbulent fluidized bed 30 at a constant bed height.

In using the equipment and method described above for the drawing of polymeric resins and in particular vinyl chloride resins the temperature of the hot gas entering gas inlet 26 can be in a range of about 50 to 175° C., the temperature maintained in the turbulent fluidized bed 30 can range from about 40 to 70° C., and the temperature of the dispersed wet solids entering drying chamber 4 through inlet 24 can be in the range of about 35 to 120° C. In the drying of polymeric resins and in particular vinyl chloride resins, it is preferred to maintain a pressure in the plenum 2 of about −1 to 3 p.s.i.g. and a pressure in the turbulent fluidized bed of about −2 to 2 p.s.i.g. However, pressures as high as 20 p.s.i.g. or as low as −10 p.s.i.g. can be used if desired.

Dried polymeric resins and in particular vinyl chloride resins can be obtained from product take-off 18 having a solids content of at least 98%. It is preferred to obtain polymeric resins with a solids content of at least 99% and preferably above 99.8%.

It will be understood by those skilled in the art that the dimensions shown in FIGURE 1 are not narrowly critical and can be varied if desired. However, these dimensions should be such as to afford an average gas velocity in the drying compartment no more than about 1.5 times that of the turbulent fluidization velocity. It will be also appreciated by those skilled in the art that the fluid bed dryer described can be modified if desired to a more sophisticated form in many ways. Thus for example the gas output 38 can be connected to a cyclone separator for removal of solid fines which may escape upwardly from the fluidized bed 30 by entrapment in the effluent gas stream. These fines can be discarded, added to the dried product or recycled to the fluid bed dryer.

While air is the cheapest gas that can be used, where oxygen sensitive materials are to be dried, an inert gas such as nitrogen, carbon dioxide, gaseous hydrocarbons for example ethane or propane or even argon can be used and recycled through a conventional gas dryer.

Solids which can be particularly advantageously dried in the fluid bed dryer of this invention, include but are not limited to fruit products, such as sugar, cocoa, instant coffee, gelatin, tea, wheat, rye, grain seeds, yeast and the like; medicaments such as aspirin, antibiotic mold culture products, citric acid, ascorbic acid, sulfa drugs, and the like; organic chemicals such as sodium acetate, ascorbic acid, calcium carbonate, organic dyes, calcium nitrate tetrahydrate, and the like; and synthetic organic polymers such as vinyl chloride homopolymers, vinyl chloride copolymers and particularly vinyl chloride vinyl/acetate copolymers, polyvinyl alcohol, polyvinyl acetate, ion exchange resins, polyacrylates, polymethacrylates, polyvinyl fluoride, polyvinylidene halides and the like.

The dispersion of the wet solids in a gas prior to their conveyance to the inlet means 24, at point 22 can be achieved by means well known in the art such as for example a cage mill, an Imp mill, Venturi, Solidaire (trademark of the Strong-Scott Manufacturing Company) and the like.

Although not essential for the practice of this invention, it is preferred that a preliminary flash drying step used for conventional drying systems be used prior to the introduction of the dispersed wet solids into the fluid bed dryer of this invention, in order to obtain maximum effectiveness of this equipment. In other words it is preferred to use the novel fluid bed dryer of this invention where its superiority is most marked, viz., in the drying of wet solids having a solids content of at least 90% by weight. Of course, if desired the novel fluid bed dryer of this invention can be used with dispersed wet solids of any solids content but in the ranges below about 90% solids content many conventional dryers can be used satisfactorily making the use of the fluid bed dryer of this invention analogous to using a precision tool where a crude one will suffice.

Other novel features of the claimed fluid bed dryer are:

(1) The use of the insulated distributor plate 8 which prevents the upper metal surface plate 12 from reaching the temperature of the gas coming in through the inlet means 26 which would cause agglomeration and adhesion of polymeric particles to the metal plate;

(2) The use of the temperature control means 28 which prevents the gas coming in through the inlet means 26 from raising the temperature of the drying resin in the fluidized bed above its decomposition or softening point;

(3) The use of the insulated bubble caps 16 which provides an optimum dispersion of gas through the fluidized bed and prevents sticking of resin to the cap;

(4) The use of the product take-off means 16 controlled through the liquid level 32 which maintains a constant height in the turbulent fluidized bed 30;

(5) The product take-off means 16 mounted in the distributor plate 8 flush with the metal surface 12 which prevents pile-up of dried resin in dead spaces and obviates the necessity of using the cumbersome screw-scraper apparatus of the prior art.

The material of construction for the upper drying compartment 4 and lower plenum 2 of the fluid bed dryer of FIGURE 1 is not narrowly critical and metal alloys normally used for such dryers can be used.

The invention is further described by the examples which follow in which all parts and percentages are by weight unless otherwise specified.

EXAMPLE 1

Water wet vinyl chloride homopolymer resin particles having an inherent viscosity of about 0.90 when measured as a 0.2% solution in cyclohexanone at 30° C. (70% solids by weight) were dispersed in air and flash dried in a Solidaire Dryer having an air inlet temperature of 160° C. and passed at a rate of 6400 cubic feet per minute (c.f.m.) and a temperature of 50° C. into inlet means 24 of a fluid bed dryer constructed as shown in FIGURE 1 with diameter $a=14'$, diameter $b=12'$, $d=6'$, $e=2'$ and $f=4'$. Air at a temperature of 150° C. and a humidity of 0.023 lb. of water per lb. of dry air was passed through the gas inlet means 26 into the plenum 2. On passing through the distributor plate 8, and bubble caps 16 into the drying chamber 4, this air formed a turbulent fluidized bed with the vinyl chloride homopolymer particles entering through the inlet means 24 above and passed out through the gas outlet means 38 at a temperature of about 60° C. The dried vinyl chloride polymer resin collected from the take-off 18 at a rate of 5,500 lbs. per hour at a solids content of 99.5%.

EXAMPLE 2

The procedure described in Example 1 was followed with the following exceptions:

(A) A vinyl chloride/vinyl acetate copolymer containing 15 percent by weight of vinyl acetate copolymerized therein and having an inherent viscosity of about .49 when measured as a 0.2% solution in cyclohexanone at 30° C. and having an average particle size of 110 microns were substituted for the vinyl chloride homopolymer of Example 1;

(B) The solids content of the copolymer dispersion entering the Solidaire Dryer was 88% by weight;

(C) The air inlet temperature in the Solidaire Dryer was 120° C.;

(D) The inlet temperature of the air entering the inlet means 26 of the fluid bed dryer of FIGURE 1 was 100° C.;

(E) The outlet temperature of the air passing through the outlet means 38 was 50° C.;

(F) The solids content of the dried copolymer collected from the solids take-off 18 was 99.0% by weight;

(G) The dried copolymer product was collected at a rate of about 6,000 lbs. per hour.

EXAMPLES 3–12

When Example 1 was repeated with the exception that in place of vinyl chloride homopolymer the dispersed solids were sugar, aspirin, ascorbic acid, citric acid, sodium acetate, polyvinyl alcohol, polyvinyl acetate, acidic ion exchange resin, polymethylmethacrylate, and polyvinylidene chloride, dried products having similar solid contents were obtained.

Although the invention has been described in its preferred form with a certain degree of particularity, it is understood that the present disclosure of the preferred forms has been made only by way of example, and that numerous changes in the details of construction and a combination and arrangement of parts may be resorted to without departing from the spirit and the scope of the invention.

What is claimed is:

1. Solid vinyl chloride polymer fluid-bed drying system comprising:
    (a) a lower plenum;
    (b) an upper drying compartment;
    (c) a perforated distributor plate mounted between the plenum and the drying compartment, said distributor plate consisting essentially of:
        (1) an upper section of metal;
        (2) a lower section of insulating material;
        (3) a bubble cap mounted through each perforation of said perforated distributor plate, save one, said bubble cap having a conical top and a plurality of orifices disposed about the lower periphery adjacent and in firm contact with the upper metal section of the distributor plate and adapted to communicate with the lower plenum through the bubble cap; and
        (4) a dried polymer take-off device mounted through one perforation of the distributor plate with one orifice flush with the upper section of the distributor plate and the other communicating with a product collection means outside the dryer;
    (d) an inlet means for dispersed wet polymer communicating with the upper drying compartment;
    (e) a gas inlet means of communicating with the plenum;
    (f) a gas outlet means communicating with the uppermost boundary of the upper drying compartment;
    (g) a product take-off control means for regulating the rate of take-off of dry polymer to maintain a constant height in a turbulent fluidized bed located in the lower part of the drying compartment adjacent the metal plates of the distributor plate; and
    (h) a temperature control means for regulating the temperature of gas in the gas inlet means in order to regulate the temperature of the turbulent fluidized bed.

2. Fluid-bed drying system claimed in claim 1 wherein the diameter of the lowermost six vertical feet of the drying compartment is 12 feet, the uppermost four vertical feet of the drying compartment is about 14 feet in diameter and the diameter of that section of the drying compartment between the uppermost and lowermost parts changes by 2 feet in a distance of 2 vertical feet within the drying compartments.

3. Fluid-bed drying system claimed in claim 2 wherein the ratio of the diameter of the drying compartment containing the turbulent fluidized bed to that of the drying compartment above the turbulent fluidized bed is about 6:7.

4. Fluid-bed drying system claimed in claim 1 wherein the dispersed wet solid inlet means is disposed tangentially to the circumference of the upper drying compartment.

5. Fluid-bed drying system claimed in claim 1 wherein the gas outlet means extends downwardly into the upper drying compartment with the lower extremity below the wet solids inlet means.

6. Method of drying wet solid vinyl chloride polymer capable of being fluidized in a fluid bed dryer comprising:
    (a) a lower plenum;
    (b) an upper drying compartment;
    (c) a perforated distributor plate mounted between the plenum and the drying compartment, said distributor plate consisting essentially of:
        (1) an upper section of metal;
        (2) a lower section of insulating material;
        (3) a bubble cap mounted through each perforation of said perforated distributor plate, save one, said bubble cap having a conical top and a plurality of orifices disposed about the lower periphery adjacent and in firm contact with the upper metal section of the distributor plate and adapted to communicate with the lower plenum through the bubble cap; and
        (4) a dried polymer take-off mounted through one perforation of the distributor plate with one orifice flush with the upper section of the distributor plate and the other communicating with a product collection means outside the dryer;
    (d) an inlet means for dispersed wet polymer communicating with the upper drying compartment;
    (e) a gas inlet means communicating with the plenum;
    (f) a gas means communicating the uppermost boundary of the upper drying compartment;
    (g) a product take-off control means for regulating the rate of take-off of dry polymer to maintain a constant height in a turbulent fluidized bed located in the lower part of the drying compartment adjacent the metal plates of the distributor plate; and
    (h) a temperature control means for regulating the temperature of gas in the gas inlet means in order to regulate the temperature of the turbulent fluidized bed which comprises steps of:
        (1) dispersing the wet polymer in a gaseous stream;
        (2) introducing the dispersed wet polymer into the upper section of the drying compartment at a temperature of about 35 to 100° C.;
        (3) introducing a gas at a temperature of about 50 to 150° C., into a plenum in a volume sufficient to maintain a bed of polymer in a turbulent fluidized state;
        (4) removing wet gas through the gas outlet means; and
        (5) removing dried polymer at a rate sufficient to maintain the constant turbulent fluidized bed height.

7. Method claimed in claim 6 wherein the solids are vinyl chloride polymers wet with water and the gas is air.

8. Method claimed in claim 7 wherein the solids content of the dried vinyl chloride polymer product is about 98 to 99.8% by weight.

9. Method claimed in claim 7 wherein the average air velocity in the drying compartment above the fluidized bed is no greater than 1.5 times the air velocity in the fluidized bed.

10. Method claimed in claim 7 wherein the vinyl chloride polymer is vinyl chloride homopolymer, the temperature of the wet homopolymer being introduced to the fluid bed dryer is about 50 to 55° C. and the temperature of the air entering the plenum is about 150 to 160° C.

11. Method claimed in claim 10 wherein the solids (References on following page)

content of the dried homopolymer recovered is at least 99%.

References Cited

UNITED STATES PATENTS

| | | | |
|---|---|---|---|
| 2,316,207 | 4/1943 | Winter | 34—10 |
| 2,378,157 | 6/1945 | Ramseyer et al. | |
| 2,548,642 | 4/1951 | White. | |
| 2,635,684 | 4/1953 | Joscelyne | 34—10 X |
| 2,668,041 | 2/1954 | Knibbs. | |
| 2,677,604 | 5/1954 | Nelson. | |
| 3,040,439 | 6/1962 | Frost. | |
| 3,017,254 | 1/1962 | Evans et al. | |
| 3,349,499 | 10/1967 | Katano | 34—10 |
| 3,349,500 | 10/1967 | Wall | 34—10 |

FOREIGN PATENTS 688,027   6/1964   Canada.

FREDERICK L. MATTESON, Jr., Primary Examiner
ROBERT A. DUA, Assistant Examiner

U.S. Cl. X.R.
34—57